United States Patent
Liu et al.

(10) Patent No.: US 7,675,818 B2
(45) Date of Patent: Mar. 9, 2010

(54) METHOD FOR TOMOGRAPHIC INVERSION BY MATRIX TRANSFORMATION

(75) Inventors: Jonathan Liu, Sugar Land, TX (US); Lorie K. Bear, Sugar Land, TX (US); Jerome R. Krebs, Houston, TX (US)

(73) Assignee: ExxonMobil Upstream Resarch Co., Houston, TX (US)

( * ) Notice: Subject to any disclaimer, the term of this patent is extended or adjusted under 35 U.S.C. 154(b) by 78 days.

(21) Appl. No.: 11/989,211

(22) PCT Filed: Jul. 5, 2006

(86) PCT No.: PCT/US2006/026477

§ 371 (c)(1),
(2), (4) Date: Jan. 22, 2008

(87) PCT Pub. No.: WO2007/018869

PCT Pub. Date: Feb. 15, 2007

(65) Prior Publication Data

US 2009/0120634 A1    May 14, 2009

(51) Int. Cl.
*G01V 1/28*    (2006.01)

(52) U.S. Cl. .......................... 367/73; 702/14
(58) Field of Classification Search ............... 367/73; 702/14
See application file for complete search history.

(56) References Cited

U.S. PATENT DOCUMENTS

| 6,253,157 | B1 | 6/2001 | Krebs |
| 6,868,037 | B2 | 3/2005 | Dasgupta et al. |
| 2006/0056272 | A1* | 3/2006 | Hill .............................. 367/73 |

* cited by examiner

*Primary Examiner*—Ian J Lobo

(57) ABSTRACT

Method for reducing instability and increasing computational efficiency in tomographic inversion for velocity model building. A system of tomographic equations is developed for a uniform grid. A non-uniform parameterization is found for which a linear mapping exists between the space of the uniform grid and the space of the non-uniform grid. The matrix that relates velocity to the tomographic data in the non-uniform representation is then given by the matrix product of the corresponding matrix in the uniform grid representation and the mapping matrix. Inversion can then be performed for the non-uniform parameterization on a smaller, more stable matrix.

10 Claims, 4 Drawing Sheets

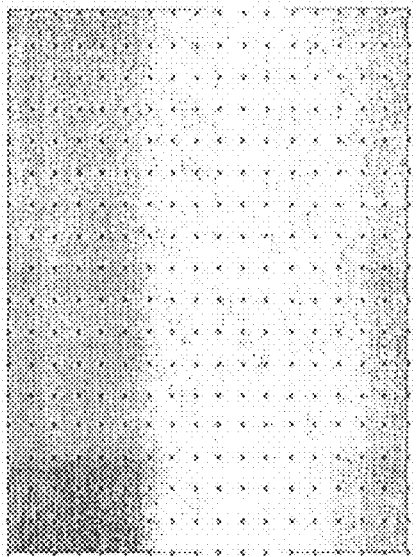
FIG. 3A Vertical Slice: Velocity — Uniform Grid
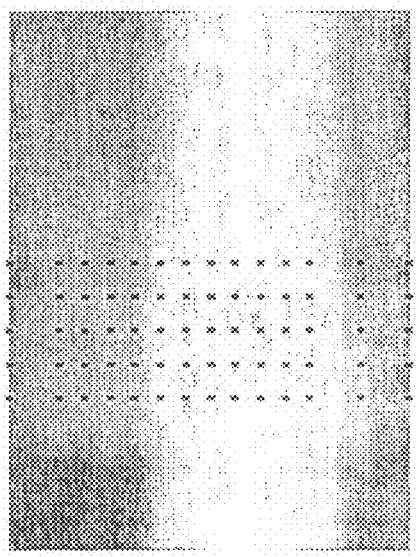
FIG. 3B Map View: Velocity — Non-Uniform Grid
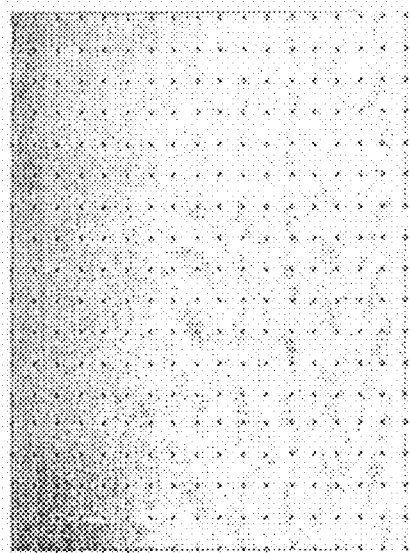
FIG. 3C Vertical Slice: Anisotropy — Uniform Grid
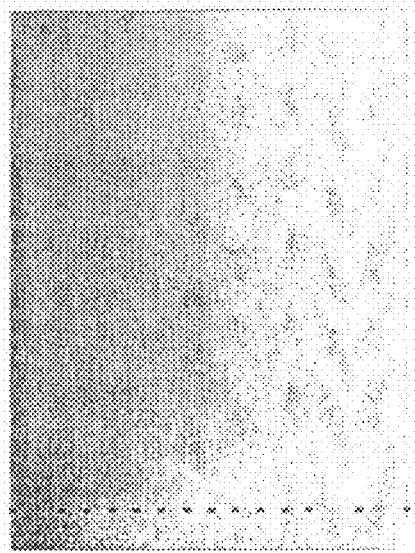
FIG. 3D Map View: Anisotropy — Non-Uniform Grid

METHOD FOR TOMOGRAPHIC INVERSION BY MATRIX TRANSFORMATION

This application claims the benefit of U.S. Provisional Application No. 60/703,162 filed on Jul. 28, 2005.

FIELD OF THE INVENTION

This invention relates generally to the field of seismic prospecting and more particularly to seismic data processing. Specifically, the invention is a method for reducing instability and increasing computational efficiency in tomographic inversion for velocity model building.

BACKGROUND OF THE INVENTION

In the oil and gas industry, a technique called tomographic inversion is used to build models in the form of data volumes giving seismic wave velocity values within a subsurface region of interest. Such techniques take several forms.

1. Uniform Grid Tomographic Inversion with Smoothing Constraint

An approach considered state-of-the-art uses a uniform grid (e.g. a grid consisting of rectangular cells) to parameterize the model and tries to stabilize the inversion by adding smoothing constraints. In general, smoothing constraints are effective in removing short-wavelength artifacts but fail to remove long-wavelength artifacts. Smoothing will also fail if the artifacts in one area are of the same wavelength as true velocity structure elsewhere in the model.

2. Multi-Scale Tomographic Inversion

This approach uses a multi-scale of uniform grids to parameterize a model. The lower scale grid model has longer wavelength and, therefore, yields a more stable solution. The multi-scale grid models can be solved progressively or simultaneously. This method multiplies the computational cost in ray tracing by the number of scales. In addition, this method still has the instability due to the underdetermined model parameters and will fail if artifacts in one area are of the same wavelength as true velocity structure elsewhere in the model.

3. Non-Uniform Grid Tomographic Inversion

This approach uses a non-uniform grid to parameterize a model. The non-uniform parameterization generally has many fewer parameters than a uniform grid. In this way, the tomographic inversion is stabilized by reducing the null space of the matrix operator. However, ray tracing is generally much slower in a model parameterized with a non-uniform grid. Furthermore, it is hard to add smoothing constraints to a non-uniform grid model.

SUMMARY OF THE INVENTION

In one embodiment, the present invention is a method for constructing a physical properties model of a subsurface region, comprising: (a) developing a linear system of tomographic equations expressed in matrix form as $Ax=b$, where x is a vector whose components parameterize the model of said physical properties in a first representation of said subsurface region, b contains information derived from measured data representative of said subsurface region and sensitive to said physical properties, and A relates said physical properties within said subsurface region to said data; (b) selecting a second representation of the subsurface region in which the model of the same physical properties is parameterized by the components of a vector y, for which representation there exists a linear mapping matrix M that maps the first representation, x, to the second representation, y, such that $x=My$; (c) performing the matrix multiplication $C=AM$; and (d) inverting the matrix equation $Cy=b$ to solve for the physical properties parameterized by y.

In many, but not all, embodiments of the invention, the first representation will be a uniform grid, while the second representation will be a non-uniform parameterization selected to substantially minimize the number of components in the vector y.

BRIEF DESCRIPTION OF THE DRAWINGS

The present invention and its advantages will be better understood by referring to the following detailed description and to the attached drawings in which:

FIGS. 2-4 illustrate an example application of the present inventive method to synthetic data, wherein:

FIGS. 3A-D show vertical slices of the uniform and non-uniform representations (grids) used in the example for velocity and for anisotropy parameters.

Figure 1:
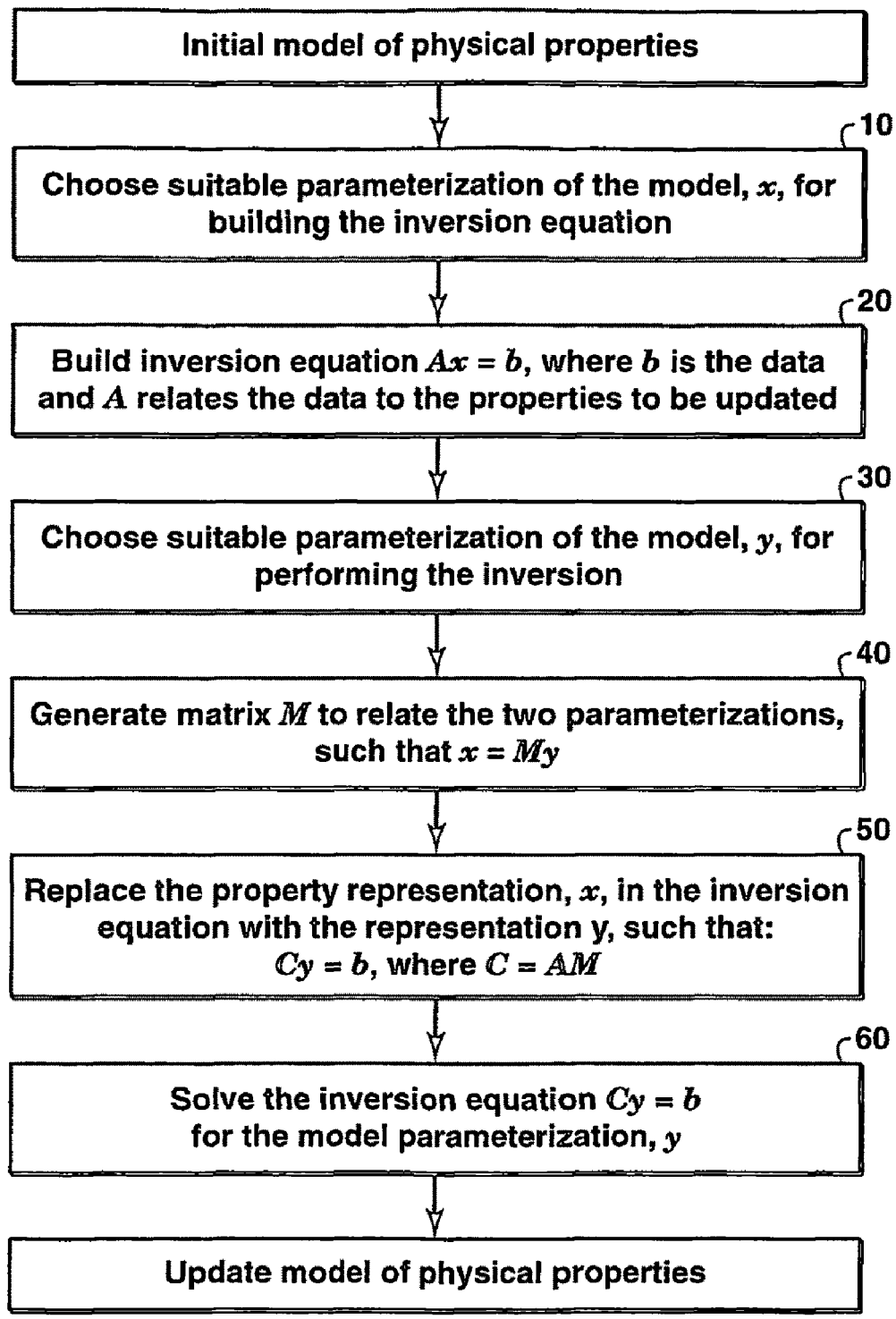
FIG. 1 is a flow chart of basic steps of the present inventive method.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention in certain embodiments uses a uniform grid velocity model to generate a linear system of tomographic equations, while it uses a non-uniform parameterization to solve an equivalent system of equations. (Parameterization means a mathematical construct using a set of parameters to assign velocity values to any point in a volume. For example, a uniform grid is a parameterization where the parameters are regularly spaced in all three dimensions of the volume. Values for points not on the grid are often defined through trilinear interpolation.) Generating the system of tomographic equations is much simpler and faster when using a uniform grid. However, a non-uniform parameterization chosen in recognition of a priori knowledge of the subterranean area will be able to represent the model variability with many fewer parameters. (The term non-uniform grid may be used instead of non-uniform parameterization or non-uniform representation so long as it is understood that the word grid does not necessarily imply uniform cells.) That this can typically be done suggests that a uniform grid has too many unconstrained parameters that will lead to instabilities in the inversion, which prediction is frequently borne out in fact. A linear relationship between the two model parameterizations is used to transform the generated linear system of tomographic equations (using the uniform grid), to a new linear system of tomographic equations that uses the non-uniform grid. Inverting this new system of equations will be more stable due to the significantly reduced number of model parameters needed. Thus, the stability of the tomographic inversion is improved while the computational costs in generating the linear system of tomographic equations is significantly reduced.

In more detail, consider a linear system of tomographic equations represented by $$Ax=b \qquad (1)$$

where A is a matrix, x is the unknown parameter vector to represent the velocity model, and b is a given data vector. A basic step in any tomographic method is to construct the matrix A by known ray-tracing methods. The ray-tracing not only traces ray paths in a velocity volume (an initial velocity volume is assumed), but also computes derivatives of depth and time data with respect to velocity parameters. Of the entire tomographic process, the ray-tracing is the most time consuming. How quickly and efficiently the ray-tracing is accomplished is highly dependent on the parameterization of the model, x. Referring to the flow chart of FIG. 1, at step 10 a suitable uniform grid representation is chosen to use for the ray-tracing, and hence the construction of the matrix A (step 20). There are many efficient and fairly straightforward algorithms for ray-tracing through a uniform grid. In contrast, evaluating the derivatives associated with the ray paths would be much more difficult on a non-uniform grid, and the computations needed to generate the tomographic equations would be more inefficient. On a ray-path segment, the tomographic equations use the relationship distance=velocity× time. Persons who work in the field will understand how the tomographic equations are developed. Others may refer to, for example, Zhang and Toksoz, "Nonlinear refraction traveltime tomography," *Geophysics* 63, 1726-1737 (1998).

The data, b, can be any type of data that can be used for tomographic inversion, including traveltime residuals (true traveltime minus modeled traveltime) and/or residual curvatures estimated in migration gathers. (Traveltime data are frequently derived at least partly from seismic data, including checkshot data.) Frequently b will contain information derived from checkshots and/or seismic data. (A checkshot is a type of seismic technique in which typically a receiver is located down in a well and the seismic source is at the surface, and the only information that is kept is the source and receiver locations and the time of fastest seismic arrival—the "first break.") Non-seismic-derived data such as sonic logs may also be used as input data for tomography.

Though a uniform grid is chosen for the sake of efficiency when building the tomographic inversion equations, as indicated above, these equations are usually not the best choice for the inversion itself. The matrix, A, for a uniform grid typically has a huge null space making it unstable for inversion. This instability can lead to artifacts in the model that may affect the interpretation of the final seismic product. Frequently a better choice, therefore, is performing the inversion on equations derived for an alternate parameterization of the model such as smooth interpolation of a set of non-uniformly distributed nodes. This non-uniform parameterization preferably has significantly fewer parameters than the uniform grid. Furthermore the density of the parameters for the non-uniform representation may be relatively large in regions having greater property variability, and relatively small in smoother regions, and this may vary from one property to the next (see the Example below). The difficulty is that, as discussed earlier, the equations are difficult and costly to produce directly for the non-uniform parameterization.

Let the vector y be a representation of the velocity model earlier parameterized by vector x, but let it be in the space of a selected non-uniform parameterization. For the purposes of this invention, this non-uniform parameterization must be chosen (step 30) such that a matrix M may be found that maps from the space of the uniform grid to the space of the non-uniform grid:

$$x=My. \qquad (2)$$

M will exist where the velocity function is defined by a linear operator on the set of values on the uniform grid. M can be obtained (step 40) by generating Green's functions ("impulse responses"). See, for example, Mortensen, "Matrix Transformation Tutorials," www.whisqu.se/per/docs/math22.htm (1995); or Kitaura, "Standardization of 3D CT measurements for length and angles by matrix transformation in the 3D coordinate system," *Cleft Palate Craniofac J.* 37, 349-356 (2000).

Substituting equation (2) into (1) yields $$Cy=b \qquad (3)$$

where C=AM. Equation (3) represents the linear system of tomographic equations in the space of the non-uniform parameterization and is step 50 in the flowchart of FIG. 1. In general, the matrix C is more stable in the inversion process than A and has a smaller size (because one is able to choose a non-uniform parameterization with fewer parameters than the uniform grid). A person of ordinary skill in the art will know of methods for inverting matrix equation (3) to solve for y (step 60). See, for example, Vesnaver and Bohm, "Staggered or adapted grids for seismic tomography?" *The Leading Edge* 19, 944-950 (2000); Hobro et al., "Three-dimensional tomographic inversion of combined reflection and refraction seismic traveltime," *Geophysical Journal International* 152, 79-93 (2003); and Zhou, "Multiscale Traveltime tomography," *Geophysices* 68, 1639-1649 (2003).

Compared to conventional approaches, the present inventive method combines advantages of both the uniform grid model and the non-uniformly parameterized model. Ray-tracing is performed in the uniform grid where it is relatively easy to do. Matrix inversion is performed in the non-uniform parameterization, where it is relatively easy to do (and more stable). A mathematical mapping function (matrix transformation) provides the connection. It can be recognized that the method is not limited to tomographic inversion problems, and can be applied to any numerical inversion problem where constructing the equations is easier in one representation/parameterization, and inverting the equations is easier in another. Another tomographic example of a physical property besides velocity and anisotropy is seismic amplitude attenuation Q. Equations relating Q to seismic data can be constructed by ray-tracing.

Choice of a particular non-uniform parameterization is significant. A preferred parameterization is one that can represent a model's variability by using only a few parameters, so that both stability and computational efficiency can be achieved. It must also be possible to transform the non-uniform grid model to a uniform grid model using a linear transformation (equation 2 above). A preferred non-uniform parameterization for the present invention is the nodal model disclosed in U.S. Pat. No. 6,253,157 to Krebs, using an interpolator that is a linear function of the model parameters. It is a robust representation of a velocity model using relatively few parameters.

Example

The utility of the present inventive method, as well as further instruction on how to perform it, is illustrated by an example application. The "true" model for this example is described by three physical properties-velocity, epsilon, and delta. A definition of the latter two parameters, which represent velocity anisotropy, can be found in an article by Thomsen, "Weak elastic anisotropy," *Geophysics* 51, 1954-1966 (1986). The velocity field consists of background values (the values that prevail absent an anomaly) that only vary linearly with depth ($v(z)=az+b$), and a small low-velocity anomaly embedded near the center of the volume and shown by the darker shading in FIGS. 2A and 2B. The anisotropy parameters, epsilon and delta, consist only of a background field which, similarly, only vary linearly with depth.

Figure 2A:
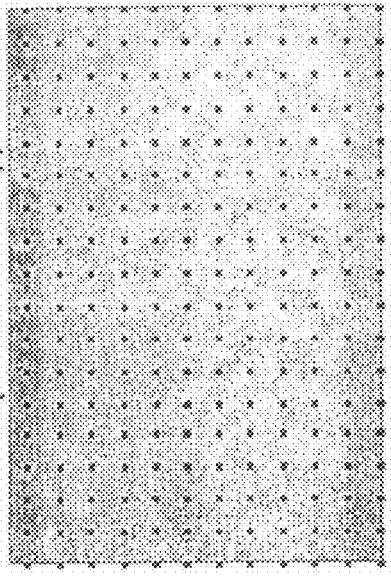
FIGS. 2A-D show depth slices of the uniform and non-uniform representations (grids) used in the example for velocity and for anisotropy parameters.
Figure 2C:
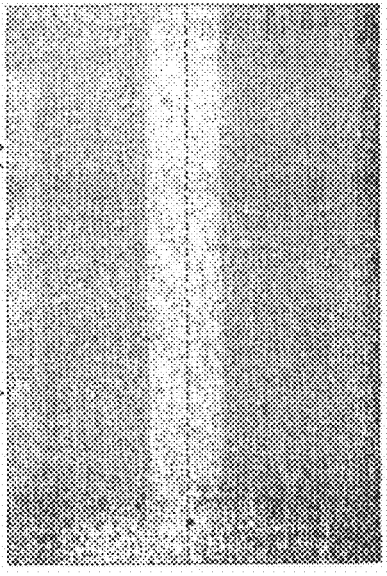
Figure 2B:
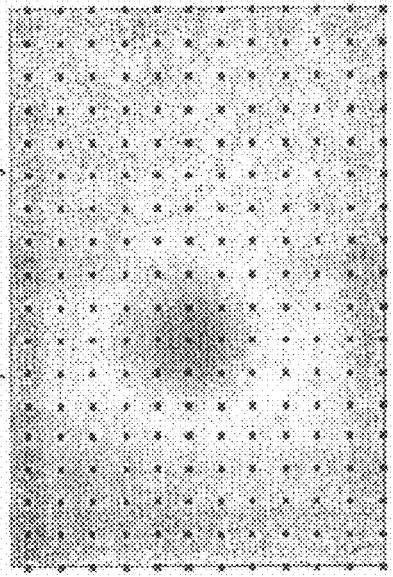
Figure 2D:
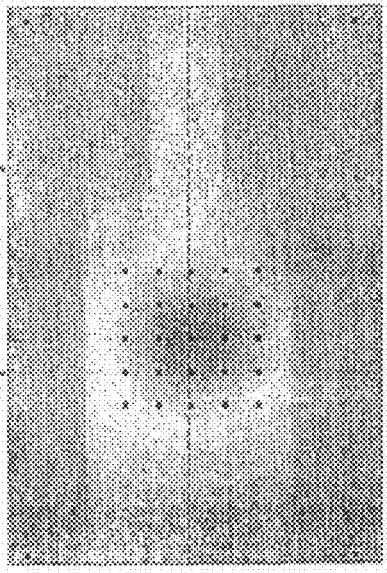

The uniform grid parameterization has nodes placed regularly in all three dimensions for all three model properties; FIGS. 2A and 2C show this in a map view (horizontal) slice, and 3A and 3C in a vertical slice, for velocity and anisotropy parameters, respectively. (Both anisotropy parameters behave in the same way.) Here, the sub-division of the spatial volume into discrete cells is denoted by a point (node) located within each cell. Values of all parameters are trilinearly interpolated between cells. The non-uniform parameterization for velocity has many nodes near the low-velocity anomaly and few nodes elsewhere (FIGS. 2B and 3B). Since there is no anomaly in the anisotropy parameters, the non-uniform parameterization has nodes only at one lateral position for the anisotropy parameters (FIG. 2D), with several nodes in depth (FIG. 3D). In all of these drawings, variation in property (parameter) values is indicated by gray-scale shading.

Both a standard uniform grid-based tomographic procedure and the present invention's tomographic procedure as outlined by the flowchart of FIG. 1 were performed. Referring to FIG. 1, the initial model consists of the background values for velocity (no anomaly) and a constant value of zero for the anisotropy parameters, which is a reasonable starting point. For a real-world data set, the initial model would usually be chosen based on some a priori knowledge about what a reasonable model would look like. Then, the matrix A was developed by ray-tracing in the initial velocity property volume using the uniform grid. For the example, synthetic seismic data were generated assuming a series of flat (horizontal) reflectors at uniform depth intervals, and using the true (with anomaly and anisotropy) velocity distribution. A synthetic checkshot was also generated. The checkshot is located in the center of the anomaly and provides information about the vertical travel times through the "true" model. Both the seismic and the checkshot data are used to produce the vector b in step 20. In the standard approach, the equation $Ax=b$ is inverted to obtain an updated velocity property model. For the approach using the present inventive method, the steps 40-60 were performed on the chosen non-uniform grid, to generate an update to the initial model.

Figure 4A:
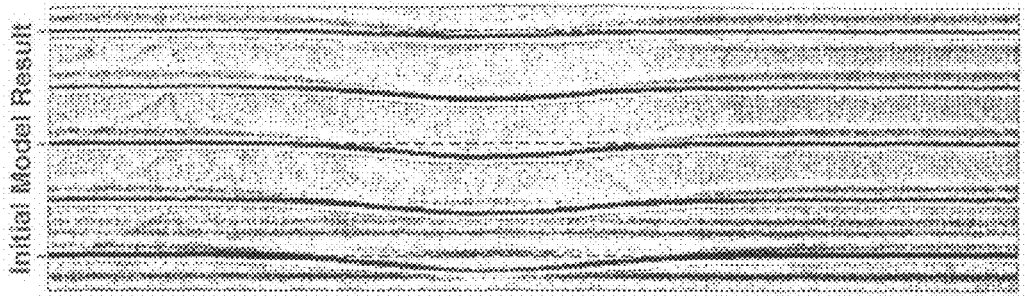
FIGS. 4A-C show a set of vertical seismic images generated using the initial velocity model result (FIG. 4A), the standard regular grid inversion result (FIG. 4B), and the present inventive method result (FIG. 4c).
Figure 4B:
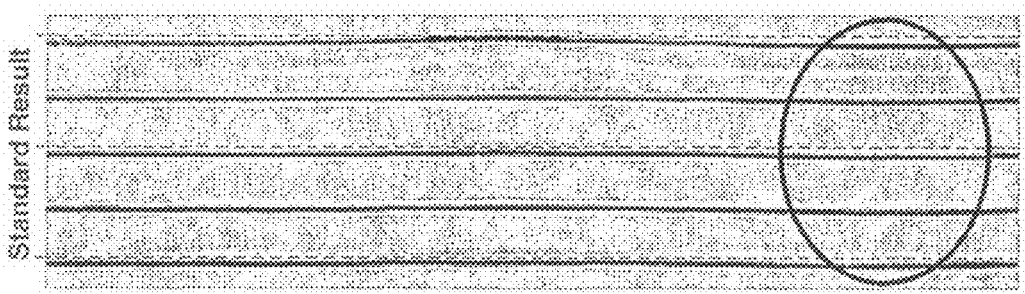
Figure 4C:
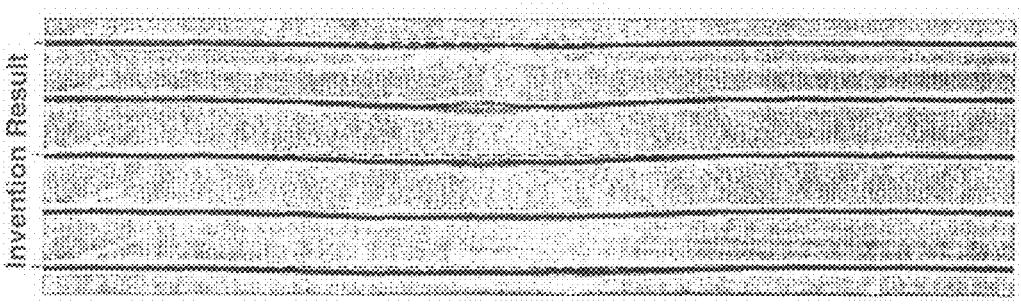

Then the two resulting models (from the present invention and the standard approach of inverting on the uniform grid) were used to image the synthetic seismic data to see how accurately they could predict the flat reflectors used to generate the data. For comparison, seismic imaging was also performed using the initial model. FIGS. 4A-C show the resulting set of vertical seismic images along the dashed line shown in FIGS. 2B and 2D. The top of each image is at the depth of the low-velocity anomaly. The dashed lines indicate the true positions for three of the imaged horizons. FIG. 4A shows the initial model result, FIG. 4B shows the standard result, and FIG. 4C shows the result obtained using the present inventive method. The horizons imaged with the initial property model (FIG. 4A) are at the correct depth everywhere except near the low-velocity anomaly (center of image) where the reflection events "sag." In the anomalous zone, the two inversion methods show comparable performance. There is still an error in the property values that leads to roughly a half-cycle sag in the seismic data. For the results using the present invention, this is the only noticeable error. The seismic outside the anomaly matches the expected results. This is not the case for the standard uniform grid-based tomographic result. Note the error in the seismic that was added to the area outside the anomalous zone, i.e., the portion of FIG. 4B within the oval. The extraneous nodes in this region were not well constrained by the data and the instability in the inversion led to the artifact in the solution. It should be noted that the artifact is roughly the same size in extent as the low-velocity anomaly, so this artifact cannot be mitigated by smoothing constraints. Though this is a synthetic example, similar artifacts are commonly seen in images produced by the standard uniform grid tomographic method.

It should be noted that for this example, a parameterization of the physical properties model is actually composed of the individual parameterizations of the three properties velocity, epsilon, and delta. Thus, for the horizontal slice pictured in FIGS. 2A-D, the non-uniform parameterization in the vector y is the set of nodes shown in FIGS. 2B and 2D. In other words, the vector y contains 27 components corresponding to that depth, 25 velocity values, 1 epsilon value and 1 delta value. By contrast, the vector x, because of its uniform grid, is assigned 648 components for that depth, 216 each for velocity and the two anisotropy parameters.

The foregoing description is directed to particular embodiments of the present invention for the purpose of illustrating it. It will be apparent, however, to one skilled in the art, that many modifications and variations to the embodiments described herein are possible. For example, the invention is explained in terms of mapping from a uniform grid to a non-uniform parameterization selected to minimize the number of parameters (nodes) needed. However, it may happen that an efficient ray-tracing method can be developed for certain types of non-uniform grids, but the user may prefer to perform the inversion in a different non-uniform grid. The invention may be used for any situation where one parameterization x is used to develop the matrix A, and a different parameterization y is used for the inversion operation. All such modifications and variations are intended to be within the scope of the present invention, as defined by the appended claims.

The invention claimed is:

1. A computer-implemented method for transforming geophysical data to a physical properties model of a subsurface region, comprising:
   (a) obtaining measured data from a geophysical survey of the subsurface region;
   (ab) developing a linear system of tomographic equations expressed in matrix form as $Ax=b$, where x is a vector whose components parameterize the model of said physical properties in a first representation of said subsurface region, b contains information derived from the measured data and sensitive to said physical properties, and A relates said physical properties within said subsurface region to said data;
   (c) selecting a second representation of the subsurface region in which the model of the same physical properties is parameterized by the components of a vector y, for which representation there exists a linear mapping matrix M that maps the first representation, x, to the second representation, y, such that x=My;

(d) using a computer to perform the matrix multiplication C=AM; and (e) using a computer to invert the matrix equation Cy=b to solve for the physical properties parameterized by y.

2. The method of claim 1, wherein the first representation is a uniform grid parameterization, and the second representation is a non-uniform parameterization.

3. The method of claim 2, wherein said non-uniform parameterization is selected to substantially minimize the number of components required y.

4. The method of claim 1, where b contains information derived from checkshot data.

5. The method of claim 1, wherein step (b) comprises:

selecting an initial physical properties model based on a priori knowledge;

developing matrix A by ray-tracing in said initial physical properties model using said first representation.

6. The method of claim 5, further comprising after said inverting step:

(f) updating said initial physical properties model with the physical properties found in the previous step; and (g) repeating steps (a)-(f) until the physical properties solution converges according to a selected criterion.

7. The method of claim 6, wherein said first representation and said second representation remain unchanged in every repeated cycle.

8. The method of claim 1, where b contains information derived from seismic or seismic-derived data.

9. The method of claim 8, wherein the physical properties are one or more selected from the group consisting of (a) velocity; (b) velocity anisotropy parameters; and (c) seismic amplitude attenuation (Q).

10. A method for producing hydrocarbons from a subsurface region, comprising:

(a) obtaining seismic data from a seismic survey of the subterranean region;

(b) obtaining a seismic wave velocity model for the subsurface region, said model having been generated by:

(i) developing a linear system of tomographic equations expressed in matrix form as Ax=b, where x is a vector whose components parameterize the seismic wave velocity model in a first representation of said subsurface region, b contains data from the seismic survey of said subsurface region, and A relates seismic velocity within said subsurface region to said seismic data;

(ii) selecting a second representation of the subsurface region in which the seismic wave velocity model is parameterized by the components of a vector y, for which representation there exists a linear mapping matrix M that maps the first representation, x, to the second representation, y, such that x=My;

(iii) performing the matrix multiplication C=AM; and (iv) inverting the matrix equation Cy=b to solve for the seismic wave velocity model parameterized by y;

(c) imaging the seismic data using the seismic wave velocity model from the previous step;

(d) drilling at least one well to a formation indicated in the seismic image; and (e) producing hydrocarbons from the formation.

* * * * *